US009743406B2

(12) United States Patent
Chen et al.

(10) Patent No.: US 9,743,406 B2
(45) Date of Patent: *Aug. 22, 2017

(54) ON THE DEFINITION OF THE RESOURCE BLOCK IN OFDMA/UL MU-MIMO IN HEW

(71) Applicant: INTEL IP CORPORATION, Santa Clara, CA (US)

(72) Inventors: Xiaogang Chen, Beijing (CN); Qinghua Li, San Ramon, CA (US); Robert Stacey, Portland, OR (US); Yuan Zhu, Beijing (CN)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/228,137

(22) Filed: Aug. 4, 2016

(65) Prior Publication Data

US 2016/0345321 A1 Nov. 24, 2016

Related U.S. Application Data

(63) Continuation of application No. 14/497,688, filed on Sep. 26, 2014, now Pat. No. 9,455,810.

(Continued)

(51) Int. Cl.
*H04L 5/00* (2006.01)
*H04W 72/04* (2009.01)
*H04B 7/0452* (2017.01)

(52) U.S. Cl.
CPC ...... *H04W 72/0446* (2013.01); *H04B 7/0452* (2013.01); *H04L 5/0007* (2013.01);
(Continued)

(58) Field of Classification Search
CPC ........... H04W 72/044; H04W 72/0446; H04W 72/0453; H04B 7/0452; H04B 1/66;
(Continued)

(56) References Cited

U.S. PATENT DOCUMENTS 7,782,807 B2 8/2010 Toon et al.
9,455,810 B2 * 9/2016 Chen ............... H04L 5/0046
(Continued)

FOREIGN PATENT DOCUMENTS

WO WO 2014/047444 3/2014

OTHER PUBLICATIONS

IEEE Standards Association "Part 11: Wireless LAN Medium Access Control (MAC) and Physical Layer (PHY) Specifications" Mar. 29, 2012 (2793 pages).
(Continued)

*Primary Examiner* — Siu Lee
(74) *Attorney, Agent, or Firm* — Jason H. Vick; Sheridan Ross, PC

(57) ABSTRACT

Techniques for resource block allocation in a multi-user MIMO High Efficiency WLAN system are provided. Specifically, teachings that when taken alone or together, provide a device or a group of devices with an improved resource allocation for the reduction of usable tone waste, are presented. The present disclosure includes a system that provides a user with a technique allocating data tones prior to the encapsulation unit or overhead tones on a resource block unit. Further, the total allocated bandwidth can be reduced prior resource allocation to overcome modulation and coding scheme downgrading caused by severe puncturing. Alternatively, only band edge basic resource blocks are reduced to account for overhead tones which largely reside on band edges.

20 Claims, 11 Drawing Sheets

Related U.S. Application Data

(60) Provisional application No. 62/017,646, filed on Jun. 26, 2014.

(52) U.S. Cl.
CPC .......... *H04L 5/0044* (2013.01); *H04L 5/0046* (2013.01); *H04L 5/0048* (2013.01); *H04L 5/0023* (2013.01)

(58) Field of Classification Search
CPC ..... H04B 1/667; H04L 5/0007; H04L 5/0048; H04L 5/0044; H04L 5/0046; H04L 5/0023
See application file for complete search history.

(56) References Cited

U.S. PATENT DOCUMENTS

| | | | |
|---|---|---|---|
| 2003/0139147 A1* | 7/2003 | Shi | H04B 1/406 455/82 |
| 2006/0067418 A1* | 3/2006 | Girardeau, Jr. | H04L 1/0068 375/265 |
| 2008/0170544 A1 | 7/2008 | Tang et al. | |
| 2009/0232238 A1 | 9/2009 | Ahmed et al. | |
| 2010/0014603 A1 | 1/2010 | Palanki et al. | |
| 2011/0255620 A1 | 10/2011 | Jones, IV et al. | |
| 2012/0093039 A1* | 4/2012 | Rofougaran | H04J 1/00 370/278 |
| 2013/0142138 A1 | 6/2013 | Dinan | |
| 2015/0358117 A1 | 12/2015 | Li et al. | |
| 2015/0381330 A1 | 12/2015 | Chen et al. | |

OTHER PUBLICATIONS

International Search Report for International Application No. PCT/US20151/030129, mailed Aug. 21, 2015.
Written Opinion for International Application No. PCT/US2015/030129, mailed Aug. 21, 2015.
Search Report for Taiwan Patent Application No. 104116043, mailed Jun. 2, 2016.
Notice of Allowance for U.S. Appl. No. 14/497,688, mailed May 23, 216.
International Report on Patentability for International Application No. PCT/US2015/030129, mailed Jan. 5, 2017.
Notice of Allowance (Including Translation) for Taiwan Patent Application No. 104116043, mailed Nov. 29, 2016.

* cited by examiner

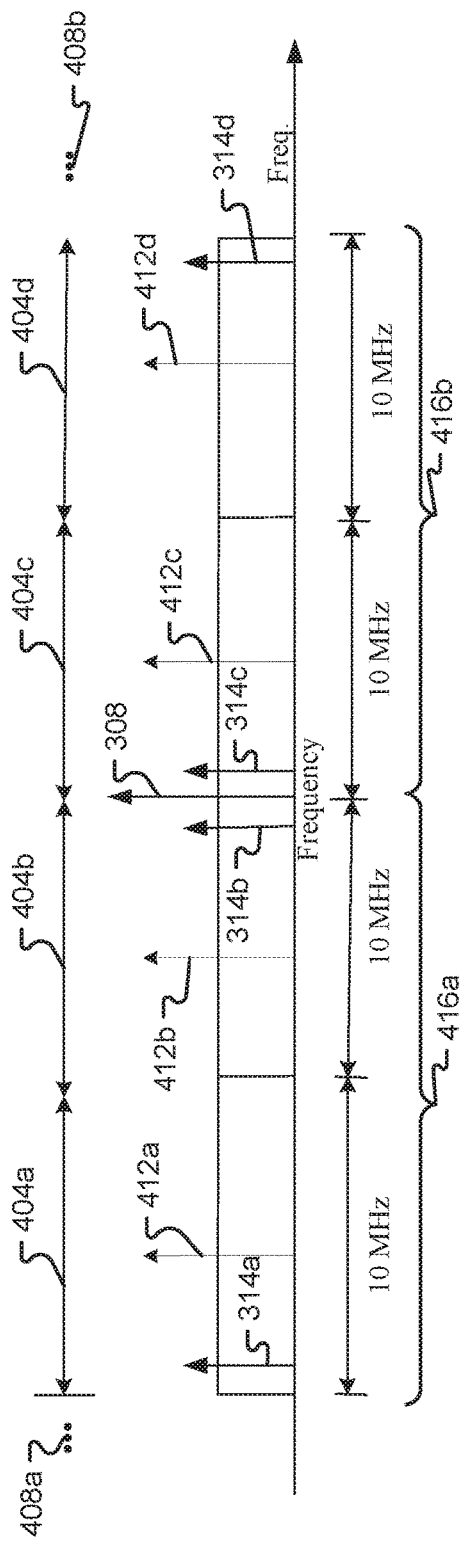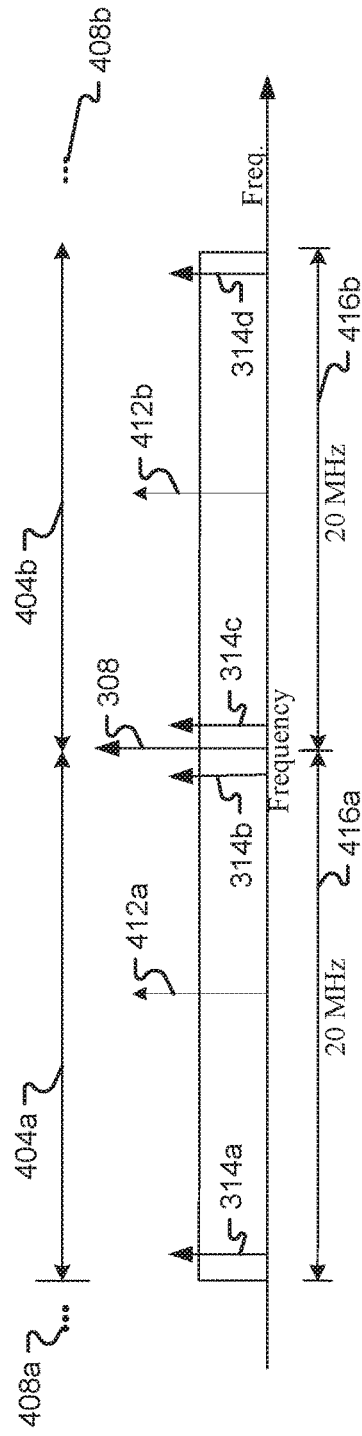

ON THE DEFINITION OF THE RESOURCE BLOCK IN OFDMA/UL MU-MIMO IN HEW

RELATED APPLICATION DATA

This application is a Continuation of U.S. patent application No. 14/497,688, filed Sep. 26, 2014, now U.S. Pat. No. 9,455,810, which claims the benefit of and priority under under 35 U.S.C. § 119(e), to U.S. patent application No. 62/017,646 filed Jun. 26, 2014, entitled "RATE MATCHED RESOURCE BLOCKS FOR WI-FI," which is incorporated herein by reference in its entirety.

TECHNICAL FIELD

Embodiments pertain to wireless networks. Some embodiments relate to wireless networks that operate in accordance with one of the IEEE 802.11 standards including the IEEE 802.11-2012 standards. Some embodiments relate to Resource Block (RB) sizing in wireless local area networks (WLAN).

BACKGROUND

The increasing demand for higher data rates in wireless communications has led industry to develop innovative ways for transmitting data. Orthogonal Frequency Division Multiple Access (OFDMA) has been known to provide such increase and it is currently used in various standards. As of recent, discussions regarding the implementation of OFDMA into the IEEE802.11 High Efficiency WLAN (HEW) standard have occurred. OFDMA is considered a new technology in HEW. However, a challenge in using OFDMA is the concept of Resource Block (RB) allocation. Resource allocation varies widely as it is applicable to different operation bandwidths, different number of DC and pilot tones and different guard band configurations. For example, a 40 MHz channel may be used in downlink transmission to serve various users operating at 20 MHz and/or 40 MHz. When the access point (AP) sends data over to two 20 MHz subchannels for two users operating with 20 MHz bandwidth, three sets of DC tones are required. The first DC tone set is used by the AP and is located at the center of the 40 MHz, the other two sets of DC tones reside at the centers of the 20 MHz subchannels for the two receiving users. In contrast, when the entire 40 MHz is used to serve a single user operating at 40 MHz bandwidth, only one set of DC tones is needed. Therefor the number of DC tones varies with the serving users' operation bandwidths.

In building a RB, the total number of usable tones will vary based on the total allocated bandwidth by the system. Bandwidths currently vary between, for example from 20 MHz-160 MHz. Further, the number of DC tones and guard tones, link direction, and OFDM symbol duration will also impact total number of usable tones. As an example, a 20 MHz subchannel may need one, three, four, five or more DC tones, numerous guard tones and about 2 pilot tones per RB. Thus, making it impossible to utilize all the usable tones in all bandwidth, allocation, and link configurations without leftover tones. In some instances, as many as 12 leftover tones go unused. The leftover tones are a waste of usable bandwidth. It is with respect to these and other considerations that the present improvements have been developed.

The 802.11 standard specifies a common Medium Access Control (MAC) Layer which provides a variety of functions that support the operation of 802.11-based wireless LANs (WLANs). The MAC Layer manages and maintains communications between 802.11 stations (such as between radio network cards (NIC) in a PC or other wireless devises or stations (STA) and access points (APs)) by coordinating access to a shared radio channel and utilizing protocols that enhance communications over a wireless medium.

802.11n was introduced in 2009 and improved the maximum single-channel data rate from 54 Mbps of 802.11g to over 100 Mbps. 802.11n also introduced MIMO (multiple input/multiple output or spatial streaming), where, according to the standard, up to 4 separate physical transmit and receive antennas carry independent data that is aggregated in a modulation/demodulation process in the transceiver. (Also known as SU-MIMO (single-user multiple input/multiple output.))

The IEEE 802.11ac specification operates in the 5 GHz band and adds channel bandwidths of 80 MHz and 160 MHz with both contiguous and non-contiguous 160 MHz channels for flexible channel assignment. 802.11ac also adds higher order modulation in the form of 256 quadrature amplitude modulation (QAM), providing a 33-percent improvement in throughput over 802.11n technologies. A further doubling of the data rate in 802.11ac is achieved by increasing the maximum number of spatial streams to eight.

IEEE 802.11ac further supports multiple concurrent downlink transmissions ("multi-user multiple-input, multiple-output" (MU-MIMO)), which allows transmission to multiple spatial streams to multiple clients simultaneously. By using smart antenna technology, MU-MIMO enables more efficient spectrum use, higher system capacity and reduced latency by supporting up to four simultaneous user transmissions. This is particularly useful for devices with a limited number of antennas or antenna space, such as smartphones, tablets, small wireless devices, and the like. 802.11ac streamlines the existing transmit beamforming mechanisms which significantly improves coverage, reliability and data rate performance.

IEEE 802.11ax is the successor to 802.11ac and is proposed to increase the efficiency of WLAN networks, especially in high density areas like public hotspots and other dense traffic areas. 802.11ax will also use orthogonal frequency-division multiple access (OFDMA). Related to 802.11ax, the High Efficiency WLAN Study Group (HEW SG) within the IEEE 802.11 working group is considering improvements to spectrum efficiency to enhance system throughput/area in high density scenarios of APs (Access Points) and/or STAs (Stations).

In the following detailed description, numerous specific details are set forth in order to provide a thorough understanding of the disclosed techniques. However, it will be understood by those skilled in the art that the present embodiments may be practiced without these specific details. In other instances, well-known methods, procedures, components and circuits have not been described in detail so as not to obscure the present disclosure.

Although embodiments are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, circuits, or the like. For example, "a plurality of stations" may include two or more stations.

Before undertaking the description of embodiments below, it may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4A depicts an embodiment of OFDMA bandwidth allocation with multiple users;

FIG. 4B depicts another embodiment of OFDMA bandwidth allocation with multiple users;

DESCRIPTION OF EMBODIMENTS

Figure 1:
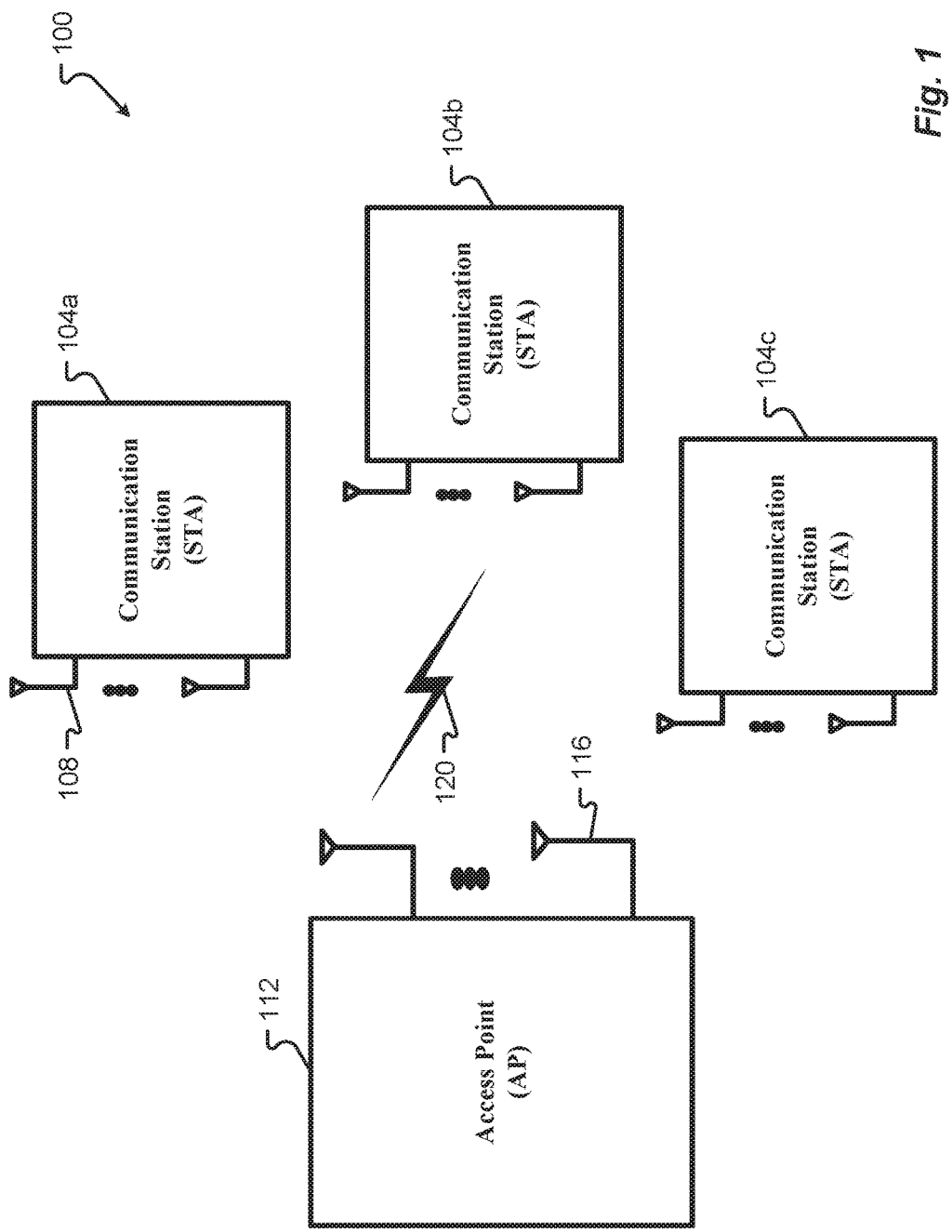
FIG. 1 depicts an embodiment of a network environment for wireless communications.

The exemplary embodiments will be described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein. Furthermore, while the exemplary embodiments illustrated herein show various components of the system collocated, it is to be appreciated that the various components of the system can be located at distant portions of a distributed network, such as a communications network, node, within a Domain Master, and/or the Internet, or within a dedicated secured, unsecured, and/or encrypted system and/or within a network operation or management device that is located inside or outside the network.

Thus, it should be appreciated that the components of the system can be combined into one or more devices, or split between devices, such as a transceiver, an access point, a station, a Domain Master, a network operation or management device, a node or collocated on a particular node of a distributed network, such as a communications network. As will be appreciated from the following description, and for reasons of computational efficiency, the components of the system can be arranged at any location within a distributed network without affecting the operation thereof. For example, the various components can be located in a Domain Master, a node, a domain management device, such as a MIB, a network operation or management device, a transceiver(s), a station, an access point(s), or some combination thereof. Similarly, one or more of the functional portions of the system could be distributed between a transceiver and an associated computing device/system.

Furthermore, it should be appreciated that the various links, including the communications channel(s) connecting the elements can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the exemplary embodiments described herein are directed toward a transmitter portion of a transceiver performing certain functions, this disclosure is intended to include corresponding and complementary receiver-side functionality in both the same transceiver and/or another transceiver(s), and vice versa.

Presented herein are embodiments of systems and processes. The embodiments may relate to a communication device and/or a communication system. The communication system can include a communication between an access point and a communication station. The communication system can further include data transmission using OFDMA. The overall design and functionality of the system described herein is generally directed to a useful and efficient way of building a resource block through efficient resource allocation.

A wireless network environment 100 that may communicate information between two or more devices is shown in FIG. 1. The wireless network environment 100 includes a plurality of communication stations 104a-c and one or more access points 112. The communication stations 104a-c can be a mobile device, including but not limited to, a mobile phone, a mobile computer, a smart phone, a laptop, netbook, personal digital assistant, tablet, etc. The access point 112 can include but is not limited to, a base station, a mobile station, femtocells, nodes, etc. Further, the access point 112 and the communication stations 104a-c can be mobile or stationary.

The communication between the two devices, for example, communication station 104a and access point 112, can include the use of one or more antennas, 108 and 116 respectively. Antennas 108 and 116 can enable single-input single-output (SISO), multi-input single-output (MISO), single-input multi-output (SIMO), multi-input multi-output (MIMO) communications, or the like. Communication between both devices can occur over a communication channel 120. The communication stations 104a-c and the access point 112 can communicate in accordance with various standards.

In an exemplary embodiment, the access point 112 can communicate with the communication station 104 in accordance with an IEEE 802.11 communication technique. In another exemplary embodiment, the communication technique can include IEEE 802.11ax (High efficiency WLAN (HEW)). In accordance with some HEW embodiments, the access point 112 may operate as a master station which may be arranged to contend for a wireless medium to receive exclusive control of the medium for a HEW control period. The access point 112 may transmit a HEW master-sync transmission at the beginning of the HEW control period. During the HEW control period, communication stations 104a-c, also known as HEW stations, can communicate with the access point 112 in accordance with a non-contention based multiple-access technique. In some exemplary embodiments, the access point may be configured to communicate with the HEW station outside the HEW control period. In an exemplary embodiment, the multiple access technique may be time-division multiple access (TDMA). In another exemplary embodiment, the multiple access technique may be frequency-division multiple access (FDMA). In the present embodiment, the multiple-access technique used during the HEW control period may be orthogonal frequency division multiple access (OFDMA).

During the HEW control period, the access point 112 may communicate with communication stations 104a-c using one or more HEW frames. In some embodiments, each link of a HEW frame may be configured for transmitting a number of spatial streams. Configuration of such links is further described in FIG. 3 below.

Figure 2:
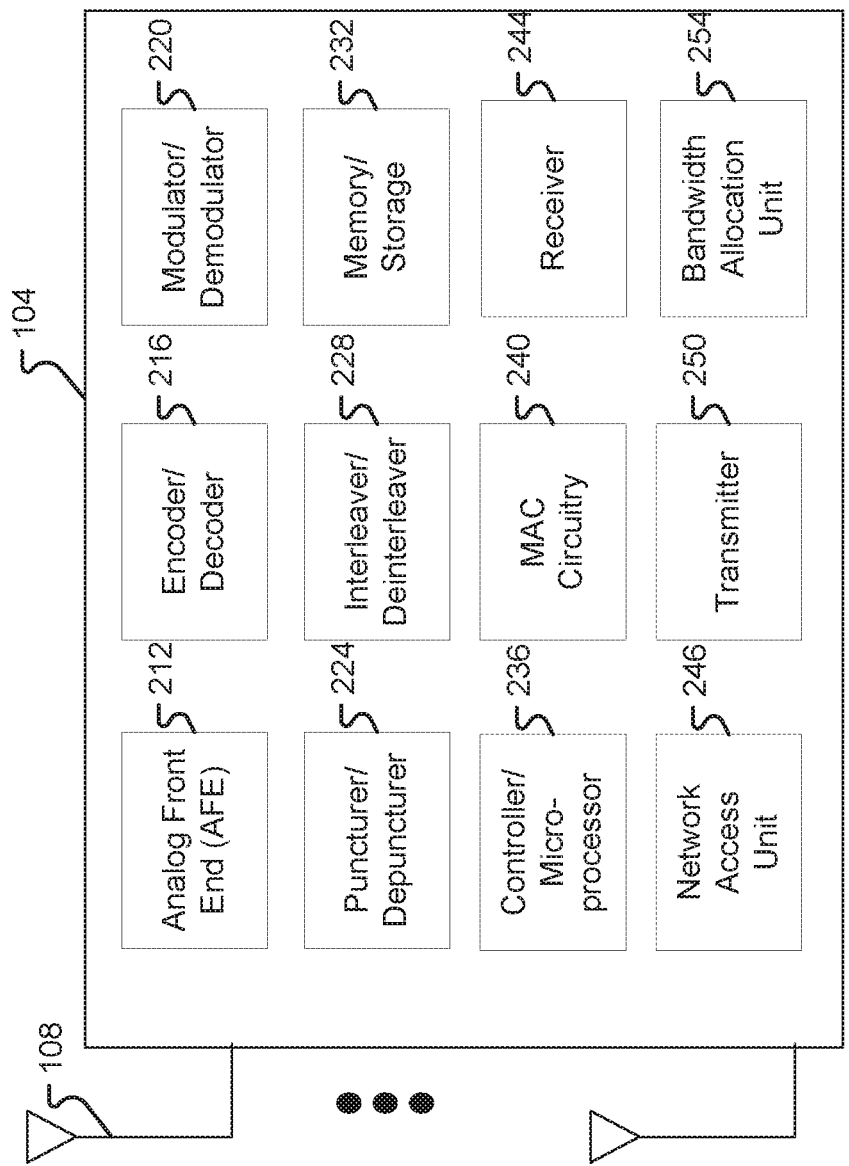
FIG. 2 is a block diagram of an embodiment of a communication station.

An embodiment of a communication station 104 is shown FIG. 2. The communication station 104 may comprise hardware and/or software that conduct various operations. The communication station 104 can be any type of computing or communication system operable to conduct the operations described here. As an example, the communication station 104 can be a mobile phone which includes and interacts with various modules and components 212-254 as shown in FIG. 2.

The communication station 104 can have one or more antennas 108, as previously mentioned, for use in wireless communications such as MIMO. The antennas 108 can include, but are not limited to directional antennas, omni-directional antennas, monopoles, patch antennas, loop antennas, microstrip antennas, dipoles, and any other antenna suitable for communications. In an exemplary embodiment, transmission using MIMO may require particular antenna spacing. In another exemplary embodiment, MIMO transmission can enable spatial diversity allowing for different channel characteristics at each of the antennas. In yet another embodiment, MIMO transmission can be used to distribute resources to multiple users.

Antennas 108 generally interact with an Analog Front End (AFE) Module 212, which is needed to enable the correct processing of the received modulated signal. The AFE 212 can sit between the antenna and a digital baseband system in order to convert the analog signal into a digital signal for processing. Within a digital baseband system, modules including, but not limited to, encoder/decoder modules 216, modulators/demodulators modules 220, puncture/depuncturer modules 224, and interleaver/deinterleaver modules 228, etc. can be found. These modules can provide the data processing and conditioning necessary for correct information transmission within a frame. The encoder/decoder module 216 comprises a circuit, device or software that converts information from one format to another through the process of encoding or decoding. The modulator/demodulator module 220 can be used to transform the information by varying a feature of the signal. Features that can be varied in the signal include, but are not limited to, frequency, amplitude, phase, etc. The puncturer/depuncturer module 224 can be used to remove bits prior to transmission to fit a particular frame size or add bits after reception to recreate the information transmitted. The interleaver/deinterleaver module 228 is a module used in error correction. The interleaver/deinterleaver module 228 can intersperse information to protect against burst errors and mitigate fading.

The communication station 104 can also include a controller/microprocessor 236 and a memory/storage 232. The communication station 104 can interact with the memory/storage 232 that may store information and operations necessary for configuring and transmitting or receiving the message frames described herein. The memory/storage 232 may also be used in connection with the execution of application programming or instructions by the controller/microprocessor 236, and for temporary or long term storage of program instructions and/or data. As examples, the memory/storage 232 may comprise a computer-readable device, such as RAM, ROM, DRAM, SDRAM or other storage devices and media.

The controller/microprocessor 236 may comprise a general purpose programmable processor or controller for executing application programming or instructions related to the communication station 104. Further, controller/microprocessor 236 can perform operations for configuring and transmitting message frames as described herein. The controller/microprocessor 236 may include multiple processor cores, and/or implement multiple virtual processors. Optionally, the controller/microprocessor 236 may include multiple physical processors. By way of example, the controller/microprocessor 236 may comprise a specially configured Application Specific Integrated Circuit (ASIC) or other integrated circuit, a digital signal processor, a controller, a hardwired electronic or logic circuit, a programmable logic device or gate array, or the like.

The communication station 104 can further include a transmitter 250 and receiver 244 which can transmit and receive signals to and from other communication stations 104 or access points 112 using one or more antennas. Included in the communication station 104 circuitry is the medium access control or MAC Circuitry 240. MAC circuitry 240 provides the medium for controlling access to the wireless medium. In an exemplary embodiment, the MAC circuitry 240 may be arranged to contend for a wireless medium and configure frames or packets for communicating over the wireless medium. The MAC circuitry 240 can work together or independently of a bandwidth allocation unit 254, which can help in allocating the bandwidth provided to the subchannels. Such bandwidth allocation unit 254 can include configuring the resource block (RB), correctly distributing the useful tones, positioning, puncturing and interleaving the pilot tones as necessary and reducing useful tone waste through rate matching.

Another module that the communication station 104 can include is the network access unit 246. The network access unit 246 can be used in the connectivity with the access point 112. In one exemplary embodiment, the connectivity can include synchronization between devices. In another exemplary embodiment, the network access unit 246 can work as a medium which provides support for frame construction and may work in conjunction with at least the MAC Circuitry 240. The network access unit 246 can also work and interact with one or more of the modules described herein.

Further, the functionality of the receiver will remain unmodified with the process described below. The overhead tone placement in corresponding resource blocks before or after data tone allocation will not play a role in modifying the receiver functionality. Similarly, reduction of RB bandwidth will not modify receiver functionality. The modules described and others known in the art can be used with the communication system 104 and can be configured to perform the operations described herein and in conjunction with FIG. 1 and FIGS. 3-11.

Figure 3:
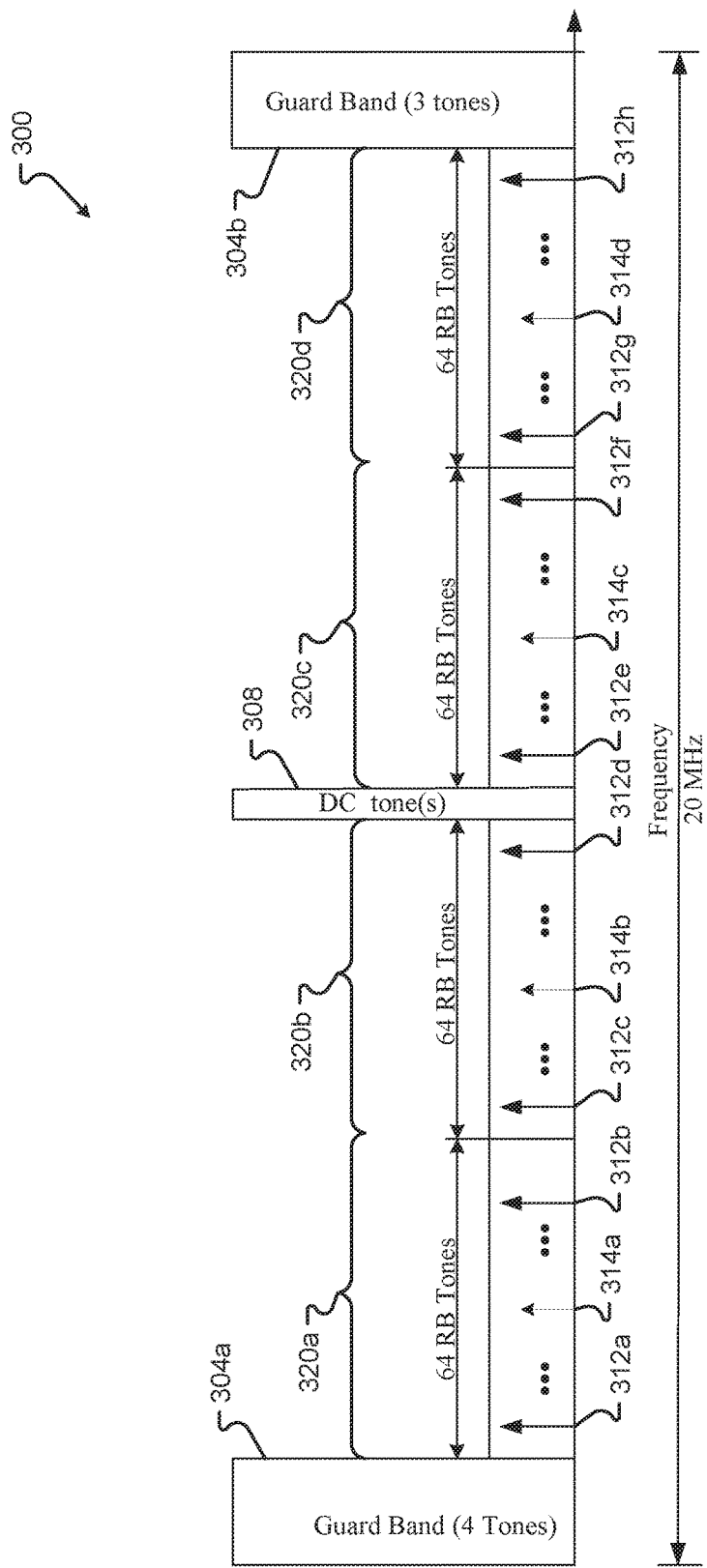
FIG. 3 depicts a high level diagram illustrating a RB structure for 20 MHz.

FIG. 3 is an embodiment of a high level diagram illustrating a RB allocation structure 300 for 20 MHz. In general, in an OFDMA wireless communication network 100, such as the one illustrated in FIG. 1, a total bandwidth is dynamically allocate to multiple users. The total allocated bandwidth can be divided into groups comprising one or more subchannels. In one exemplary embodiment, the bandwidth is broken down into groups comprising one and up to eight contiguous 20 MHz subchannels. In another exemplary embodiment, the total allocated bandwidth can be broken down into one of 20 MHz, 40 MHz, or 80 MHz contiguous bandwidths or an 80+80 MHz non-contiguous bandwidth. In yet another exemplary embodiment, the total allocated bandwidth can be broken down into 10 MHz, 5 MHz or any other combination of subchannels. In a present embodiment, the group comprises one 20 MHz subchannel allocation. In the RB allocation structure 300, DC tone(s) 308, pilot tones 314a-d, data tones 312a-h, and guard tones 304a-b, all need to be accounted for within the subchannel. In one example, within the 20 MHz subchannel, resource blocks can be allocated 5 MHz subbands 320a-d. Data tones 312a-h can be one or more data tones within the subband, as can pilot tones 314a-d and guard tones 304a-b. DC tone(s) 308 can be on or more tones or a set of tones. For example, data tones 312a, can represent one or more data tones in the 5 MHz subband 320a and DC tone(s) 308 can be a set of tones.

In one embodiment, a 256 FFT for a 20 MHz subchannel can be used (i.e. 4x symbol rate). Similarly, for a 40 MHz and an 80 MHz subchannel a 512 and a 1024 FFT can be used. Therefore, for each of these 5 MHz subbands 320a-d, the use of 64 contiguous RB tones has been proposed. For example, in the 5 MHz subband 320a, sixty-four contiguous RB tones can be allocated, 62 tones of data tones 312a-b and 2 tones of pilot tones 314a. The pilot tones 314a-d can be used to synchronize with the receiver and can provide information about the channel conditions to the receiver. The guard tones 304a-b can be used to mitigate the interference from adjacent frequency bands that are not synchronized with the band of interest. DC tone(s) 308 can be reserved so that no signal is put on it such that the operation voltages of the baseband amplified and RF mixer do not fluctuate with the DC component of the signal.

As described in conjunction with FIGS. 1 and 2, the total number of usable tones and thus available data tones 312a-h varies with bandwidth (e.g. 20/40/80/160 MHz). The number of DC tone(s) 308 and guard tones 304a-b used will also vary the total number of data tones 312a-h available for use. The number of guard tones 304a-b and DC tones 308 required depends on the OFDM symbol duration, i.e. 1×, 4×, and 8×. The number of DC tone(s) 308 needed for transmission and/or reception depends on the actual resource allocation of OFDMA and the operation bandwidth of the scheduled user. For example, in a transmission with a 4× symbol duration, about 5 DC tones are needed for each DC location.

Link direction (i.e., uplink or downlink) also plays a role in the number of usable tones available. As an example, a communication station 104 that is allocated a 5 MHz subband 320a with 4× symbol duration, can have 64 data tones 312a-b in downlink transmission but only 62 data tones 312a-b in uplink transmission. In general this can occur because pilot tones 314a can be shared by multiple users in downlink transmission, thus allowing for more data tones 312a-b. However, in uplink transmission, the pilot tones 314a would not be shared and thus less bandwidth available for the data tones 312a-b.

FIGS. 4A and 4B depict two embodiments of OFDMA bandwidth allocation with multiple users. FIG. 4A depicts an exemplary embodiment of a bandwidth allocation in downlink transmission with two 20 MHz bandwidth allocations 416a and 416b, five DC tones 308, 412a-d and four pilot tones 314a-d. Notice that, DC tones 308 and 412a-d can be one or more data tones or sets of tones. For example, DC tone(s) 412a, can represent a set of tones in allocated bandwidth 404a. Further, DC tone(s) 308 are reserved for the access point 112 receiver, while DC tones 412a-d are non-signal tones reserved for each of the users or communication stations 104 in the system.

In an exemplary embodiment, allocated bandwidths 404a-d can represent allocated bandwidths for different users. However, more or less users may be present as represented by the ellipses 408a-b. That is, allocated bandwidth 404a is the allocated bandwidth for a first communication station 104 with corresponding DC tone(s) 412a. Pilot tones 314a-d can be shared by users in downlink transmission. In this embodiment, the allocated bandwidths 404a-d area also the RB bandwidths.

Similarly, FIG. 4B provides another exemplary embodiment of a different bandwidth allocation. FIG. 4B depicts a bandwidth allocation in uplink mode with two 20 MHz bandwidth allocations 416a and 416b, three DC tones 412a-b, 308 and four pilot tones 314a-d. As with FIG. 4A, allocated bandwidth 404a-b can represent the allocated bandwidth to different users. More or less users can exist, represented by ellipses 408a-b. As such, a first communication station 104 in this embodiment would have allocated bandwidth 404a with its respective pilot tones 314a-b and DC tone(s) 412a. Again, the number of users can vary as can the allocated bandwidth for each of the users.

As exemplified in FIGS. 4A-B, the numbers of tones needed in a given allocated bandwidth often varies, as do other parameters which play a large role as to the number of tones that can actually be used for data transmission. As such, it is often impossible to find a single RB that can utilize all usable tones for all operation bandwidths, and/or allocations and/or, link configurations without leftover tones. In some embodiments, up to 12 leftover tones have been unused, leading to a waste of usable bandwidth and a significant reduction in throughput.

Figure 5:
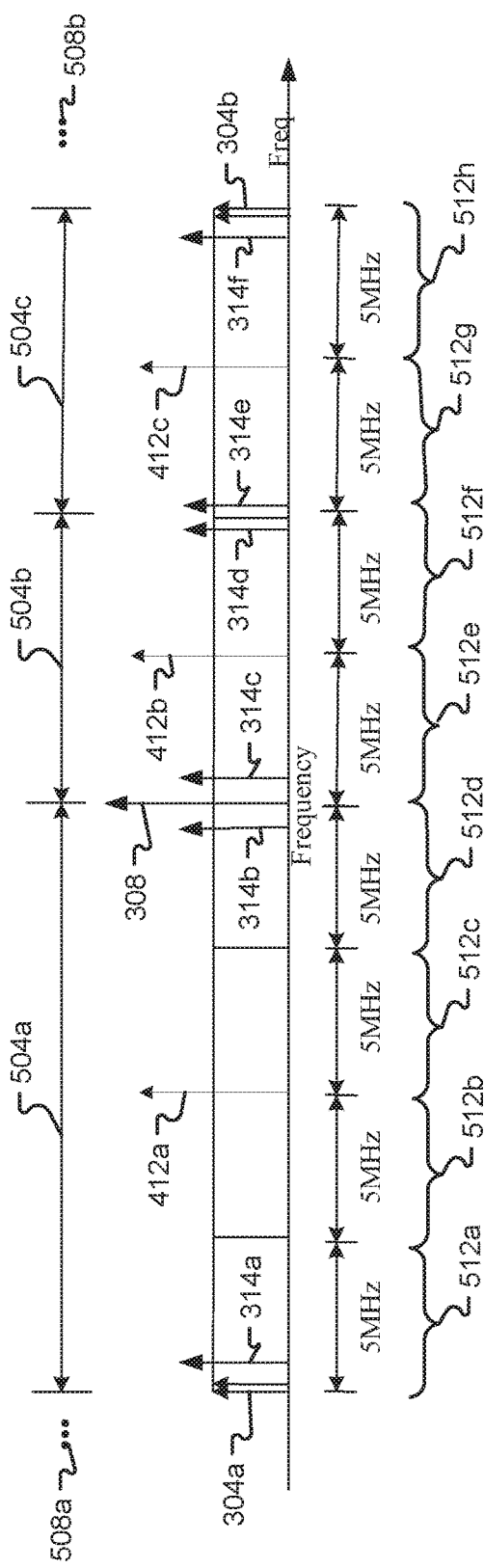
FIG. 5 depicts an embodiment of a RB allocation with even tone distribution.

FIG. 5 is an embodiment of an improved RB allocation with even tone distribution for reduced bandwidth waste. This improved design adopts a similar rate matching scheme used in LTE as a proposed solution in Wi-Fi. To overcome or reduce waste, overhead tones including DC tones 308, 412a-c, guard tones 304a-b and pilot tones 314a-f, are not considered during RB allocation. That is, these overhead tones are treated as an encapsulated unit which is not taken into account until a later time in resource allocation.

FIG. 5 illustrates three users with allocated bandwidths 504a, 504b and 504c, respectively having 5 MHz RB bandwidths 512a-h. A first user with allocation bandwidth 504a is allocated four 5 MHz RB bandwidths 512a-d, pilot tones 314a-b and DC tone(s) 412a. The second and third users with allocated bandwidths 504b, 504c are allocated two 5 MHz RB bandwidths 512e-h each with corresponding DC tones 412b-c and pilot tones 314c-f. Guard tones 304a-b are also allocated within the RB bandwidths 512a-h. More or less users can be presented with corresponding allocated bandwidths as represented by ellipses 508a and 508b.

In the design depicted in FIG. 5, the 5 MHZ RB bandwidths 512a-h can be used to determine the RB size, which is what defines the number of tones in a given resource block. These tones are the usable tones described above which often go wasted and are used for both data tones and overhead tones 308, 304a-b, 314a-f. In the present embodiment, the data tones are allocated to the entire RB, i.e., the information bits are encoded and mapped to the RB bandwidths 512a-h in their entirety. Once the data tones are in place, some of the tones are replaced by the required DC tone(s) 308, guard tones 304a-b, and possible pilot tones 314a-f. Since the number of points in the FFT is a power of 2, as seen below, the number of tones in the resource block or RB size can also be a power of 2. This ensures that all usable tones are allocated without waste.

In other words, a RB bandwidth is determined, data symbols are interleaved and distributed within that RB and some of the data tones are then punctured to make room for overhead tones. Once the puncturing is complete, the overhead tones are placed in the corresponding punctured locations. Alternatively, the data symbols are not mapped to the punctured tone locations or removed and instead a reduced number of data symbols are interleaved and mapped to the data tone locations. Puncturing, interleaving, bandwidth allocation, etc., can be performed by the modules described herein and in conjunction with FIG. 2. These modules can include the pucturer/depucturer module 224, the interleaver/deinterleaver module 228, encoder/decoder module 216, modulator/demodulator module 220, the bandwidth allocation unit 254 and other modules depicted in FIG. 2 or otherwise known in the art.

RB bandwidth can be determined a number of ways. In one embodiment, RB bandwidth is determined through subcarrier spacing. In this embodiment, once subcarrier spacing is determined, the resource block size is found and multiplied by the subcarrier spacing to provide the resource block bandwidth. In another embodiment, the RB bandwidth can be determined by dividing the total allocated bandwidth by the number of subbands.

For the first embodiment, the subcarrier spacing is determined by dividing the total allocated bandwith by the size of the FFT. Once the subcarrier spacing is known, the resource block (RB) size can found by dividing the total allocated bandwidth by the number of subbands (i.e., K=M/N, where K is the RB size, M is the total number of subcarriers and N is the number of subbands). This will provide the number of tones that should be designated to each RB. Multplying the number of tones in the RB by the subcarrier spacing will provide the desired RB bandwidth. For example, in a system with a 20 MHz bandwidth with a 256 FFT and 4 subbands: 1) first determine the subcarrier spacing, (i.e., Subcarrier spacing=BW/M=20 MHz/256=0.078125 MHz) 2) determine RB size (i.e., K=M/N=256/4=64 tones) and 3) determine RB bandwidth (i.e., RB bandwidth=subcarrier spacing*K=0.078125 MHz*64=5 MHz).

In the second embodiment, RB bandwidth can simply be determined by dividing the total allocated bandwidth by the number of subbands. For example, in a system with 20 MHz total allocated bandwidth, 256 or 64 FFT and 4 subbands, RB bandwidth=BW/N=20 MHz/4=5 MHz RB bandwidth. Once the RB bandwidth is known, then the method above can be used to determine the RB size to determine the number of tones in each unit. For example, an 80 MHz total allocated bandwidth with 1024 FFT and 16 subbands will have a 5 MHz RB bandwidth. The subcarrier spacing can be found to be 0.078125 MHz and the RB will contain 64 tones. Since the data rate of each user is mainly determined by the bandwidth, not the subcarrier spacing, the RB bandwidth may be defined first. These examples do not limit the method for determining the RB bandwidth other methods can be used as known to one of skill in the art.

In the present embodiment, the RB bandwidth can be determined by the standard. The system and/or network, simply use the RB bandwidth defined in the specification instead of selecting it dynamically.

Figure 6:
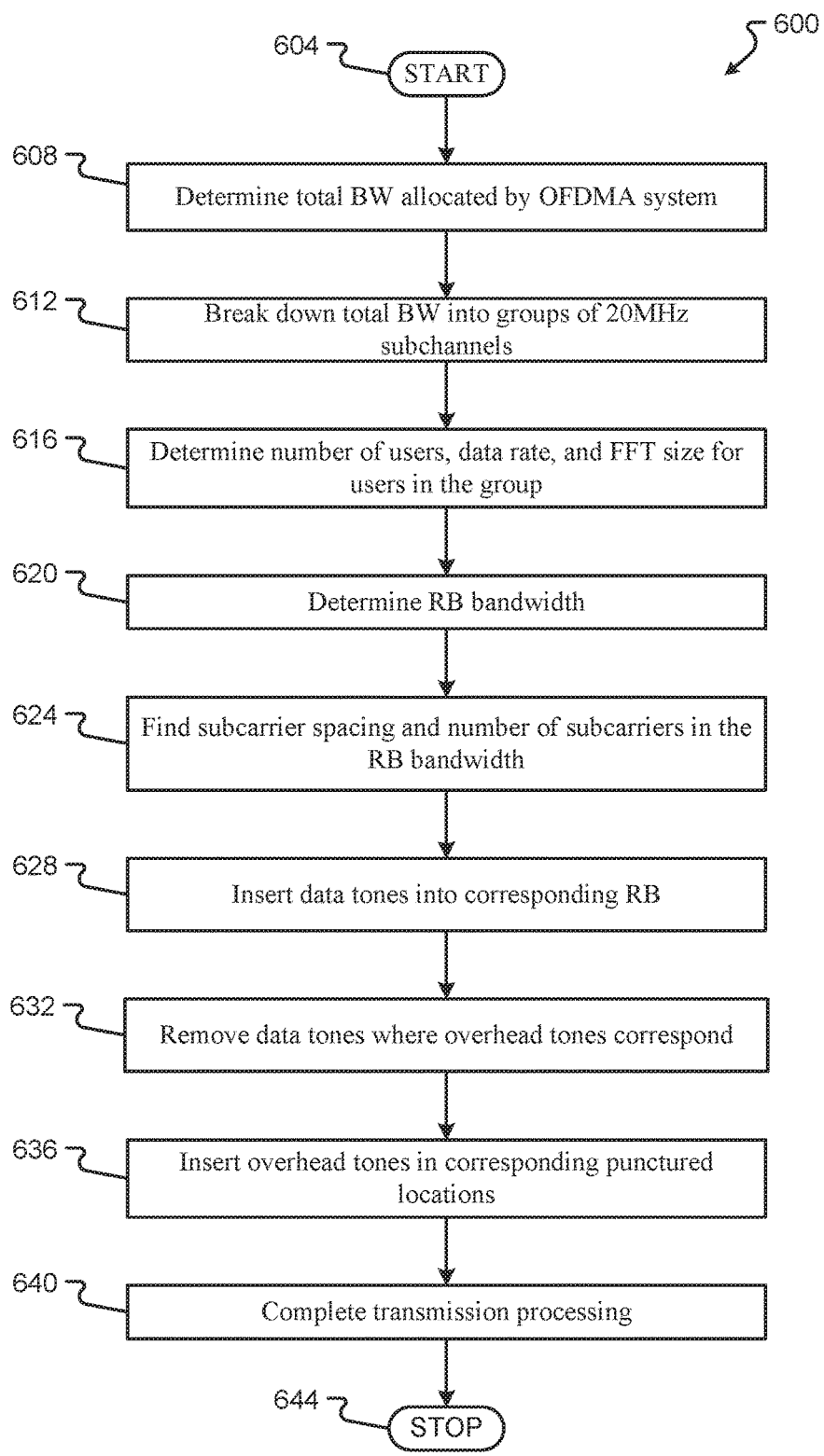
FIG. 6 is a flow or process diagram of a method for determining tone distribution.

An exemplary method 600 for determining tone distribution is shown in FIG. 6. Generally, the method 600 starts with a start operation 604 and ends with an end operation 644. The method 600 can include more or fewer steps or can arrange the order of the steps differently than those shown in FIG. 600. The method 600 can be executed as a set of computer-executable instructions executed on a computer system and/or microprocessor and encoded or stored on a computer readable medium. Hereinafter, the method 600 shall be explained with reference to the systems, components, modules, software, user interfaces, etc., described in conjunction with FIG. 1-5.

In a communication station, bandwidth is allocated by an OFDMA system. The OFDMA system dynamically allocates bandwidth on a network on an as needed basis based on the demand of the nodes connected to the system and possible power savings in step 608. Therefore, an AP can select a 20 MHz mode for example, when the traffic load is light. The total allocated bandwidth can range for example, from 20 MHz-160 MHz. In one embodiment, the total allocated bandwidth can include any of, but not limited to 20 MHz, 40 MHz, 80 MHz, or 160 MHz. Once the total allocated bandwidth has been allocated by the OFDMA system, the total allocated bandwidth is broken down into groups of contiguous 20 MHz subchannels, in step 612. In one exemplary embodiment, each group can comprise one and up to eight 20 MHz subchannels. In another embodiment, the subchannels can be grouped into one of 20 MHz, 40 MHz, or 80 MHz contiguous bandwidths or an 80+80 MHz (160 MHz) non-contiguous bandwidth. In yet another embodiment, a 320 MHz contiguous bandwidth can be used. In a further embodiment, the groups can comprise 5 MHz and/or 10 MHz subchannels with other groups possible.

Based on the demands on the nodes in a system, the subchannels are further divided. Division will occur according to the number of users, data rate, and FFT size for the users in the group. The system will make this determination accordingly, in step 616. Next, as described herein, and in conjunction with FIG. 5, the RB bandwidth is determined in step 620. As previously explained, RB bandwidth can be found through various methods. In one embodiment, the bandwidth can be determined through subcarrier spacing. In another embodiment, the bandwidth is determined based on the FFT size. Since data rate of each user is mainly determined by bandwidth, and not by subcarrier spacing, the RB bandwidth can be determined first. In the present embodiment, the RB bandwidth can be specified by the standard and the AP allocates the different number of RBs to users during system operation.

Once the RB bandwidth is known, subcarrier spacing and the resource block can be computed as indicated in step 624. Subcarrier spacing is a function of the total allocated bandwidth and the size of the FFT. The resource block size or number of subcarriers in the RB bandwidth is found by dividing the RB bandwidth by the subcarrier spacing. An example of how to determine the subcarrier spacing and number of subcarriers in the RB bandwidth can be found by assuming a 20 MHz total allocated bandwidth with 64 FFT and 4 subbands, and simply dividing the 20 MHz total allocated bandwidth by the size of the FFT. In this instance, subcarrier spacing would be 0.3125. For a RB bandwidth of 5 MHz, this would correspond to a 16 tone resource block. More detailed descriptions and examples are described above under FIG. 5.

With subcarrier spacing determined and the number of subcarriers to be used in the RB bandwidth, the communication station 104 can begin inserting subcarriers or data tones into each of the resource blocks. Step 628 exemplifies this. Again, the coding and modulating of the symbols using the modules and components are described in detail in FIG. 2. Step 632 and step 636, involve the removal or puncturing of some of the data tones that were distributed about the total allocated bandwidth and replaced by the overhead tones (i.e., DC tones guard tones, and pilot tones). Alternatively, the overhead tones can be replaced by "NULL" bits, as place holders for the overhead tones, prior to being interleaved and punctured after, but this turns out to be a lot more costly in terms of interleaver complexity. This method is described in greater detail below. Step 640 completes the process and transmits or receives the frames.

Figure 7:
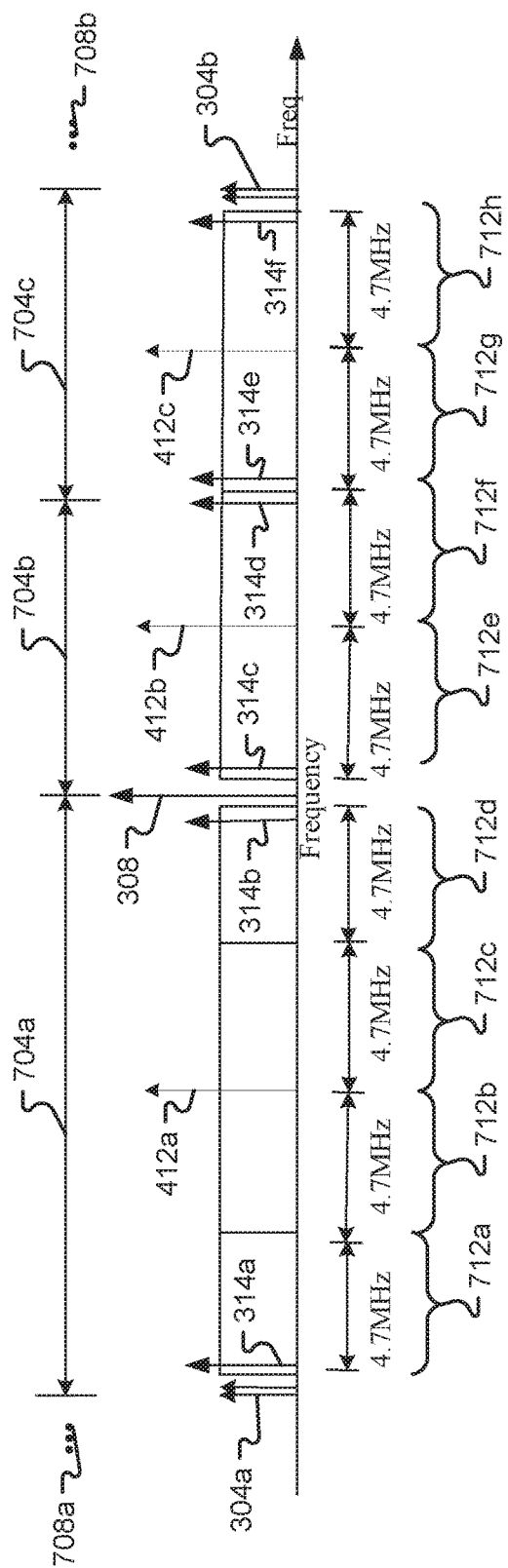
FIG. 7 depicts an embodiment of resource block subcarrier allocation with overhead tones removed.

FIG. 7 depicts another embodiment of subcarrier allocation with overhead tones removed. This embodiment describes uplink transmission with two 10 MHz allocated bandwitdths 704b-c and one 20 MHz allocated bandwidth 704a, 4 DC tones 308, 412a-c and pilot tones 314a-f. However, more allocated bandwidths are possible as demonstrated by ellipses 708a, b. In the present embodiment, a technique for reducing usable tone waste is presented. In this embodiment, each of the RB bandwidths is resized to account for overhead tones. Since puncturing 3-5 data tones is usually required at the band edge to accommodate guard tones 304a-b, a user that is allocated a single resource block at the band edge may need to switch to a lower modulation coding scheme to compensate for the larger loss due to the puncturing. In general, guard tones 304a-b of the band edges and center tone (i.e., DC tone(s) 308) of the band are unavailable for data transmission. In addition, at least one or two tones have to be used as pilot tones 314a-b even when only a single user is in the system. Therefore, this embodiment proposes to subtract some of the bandwidth to account for those tones prior to counting the available resource blocks in a band. By subtracting the bandwidth ahead of time, the effect of Modulation and Coding Scheme (MCS) downgrading due to puncturing can be reduced.

FIG. 7 illustrates usable resources for building resource blocks after some overhead tones are removed. Present in the current embodiment, are three users with allocated bandwidths 704a, 704b and 704c. Each user has a corresponding pilot tones 314a-f and DC tones 412a-c. However, guard tones 304a-b and the DC tone(s) 308 for the receiver are no longer part of the resource blocks. The total allocated bandwidth has been reduced by the amount required for those overhead tones and then the RB bandwidth is determined based on the remaining bandwidth. For example, a 20 MHZ total allocated bandwidth with 64 FFTs has a tone spacing of 0.3125 MHz as described above. For a 5 MHz RB bandwidth, the number of tones in the RB is 16. If one of the 16 tones is reserved for overhead, the remaining resource block is now 4.6875 MHz or 15 tones wide. Since different users still require pilot tones 314a-f and DC tones 412a-c, additional puncturing will still be required. For ease and simplicity, the RBs can be kept constant as illustrated by 4.7 MHz RB bandwidth 712a-h. However, because the overhead tones for operating in the band varies with total allocated bandwidth, some tones may remain unused. To compensate, these tones can be used as additional guard tones 304a-b, DC tones 412a-c, 308 or pilot tones 314a-f. In another embodiment, once the subcarrier spacing is found and number of tones to be removed determined, the total allocated bandwidth can be reduced by that amount and the new bandwidth could then be divided evenly through the number of subbands to be used, here 4.7 MHz. In yet another embodiment, a combination of both methods could be applied.

Figure 8:
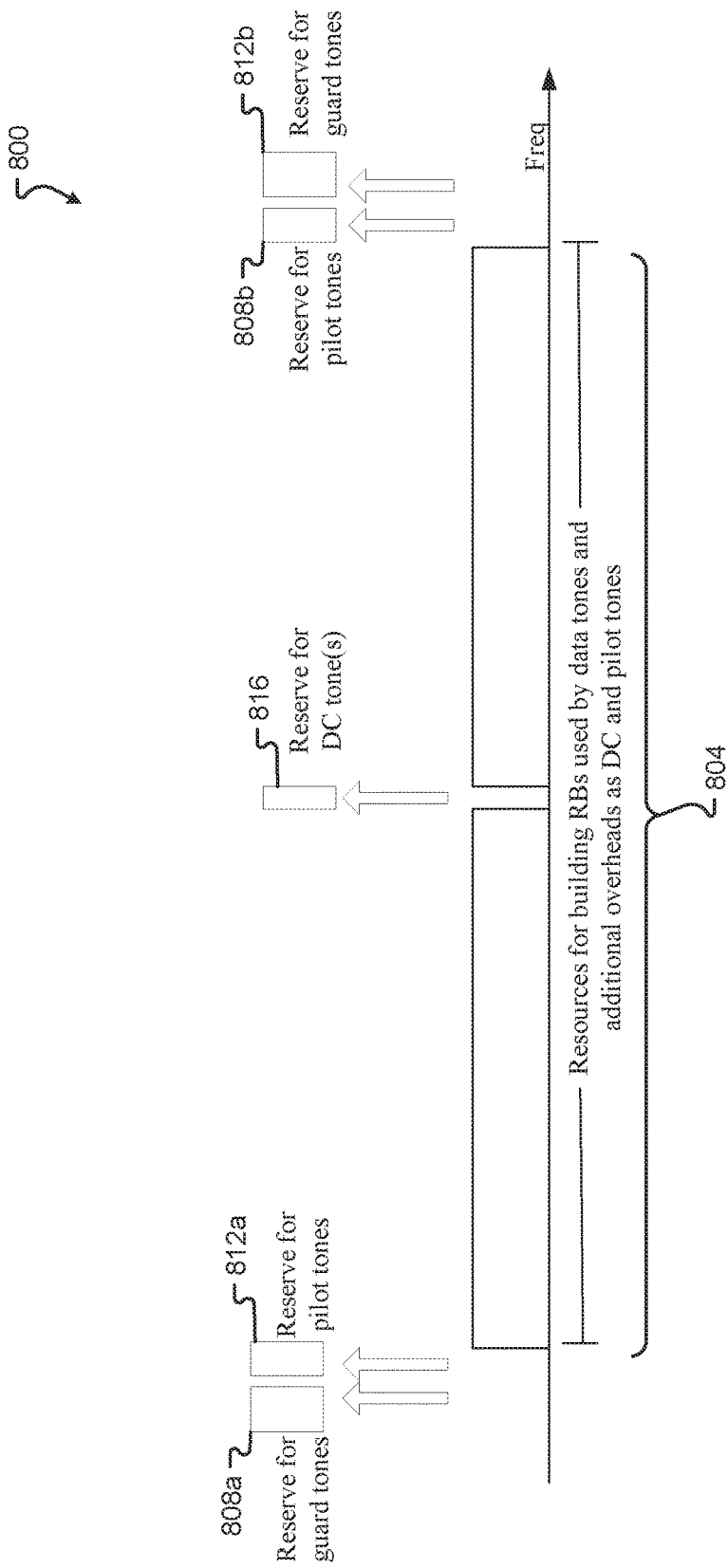
FIG. 8 depicts an embodiment of overhead tone bandwidth reservation prior to building the resource block.

FIG. 8 depicts an embodiment of overhead tone bandwidth reservation 800 prior to building resource blocks. As described herein and in conjunction with FIG. 7, overheads tones, including the DC tone(s) at the center and the guard tones at the band edges and maybe one or more pilot tones can be removed from the total allocated bandwidth and RBs smaller than the previous one can be defined. FIG. 8 depicts this technique, where guard tone bandwidths 808a-b are reserved for guard tones, pilot tone bandwidths 812a-b are reserved for pilot tones and DC tone bandwidth 816 at the center location of total allocated bandwidth 804 is reserved for the DC tone(s). Accordingly, these three bandwidths 808a-b, 812a-b and 816 are removed, corresponding to the number of tones needed to ensure proper transmission and reception, from the total allocated bandwidth 804. As a result, a smaller total bandwidth is now available for use by the data tones and any additional overhead tones (i.e., other DC tones and pilot tones).

Figure 9:
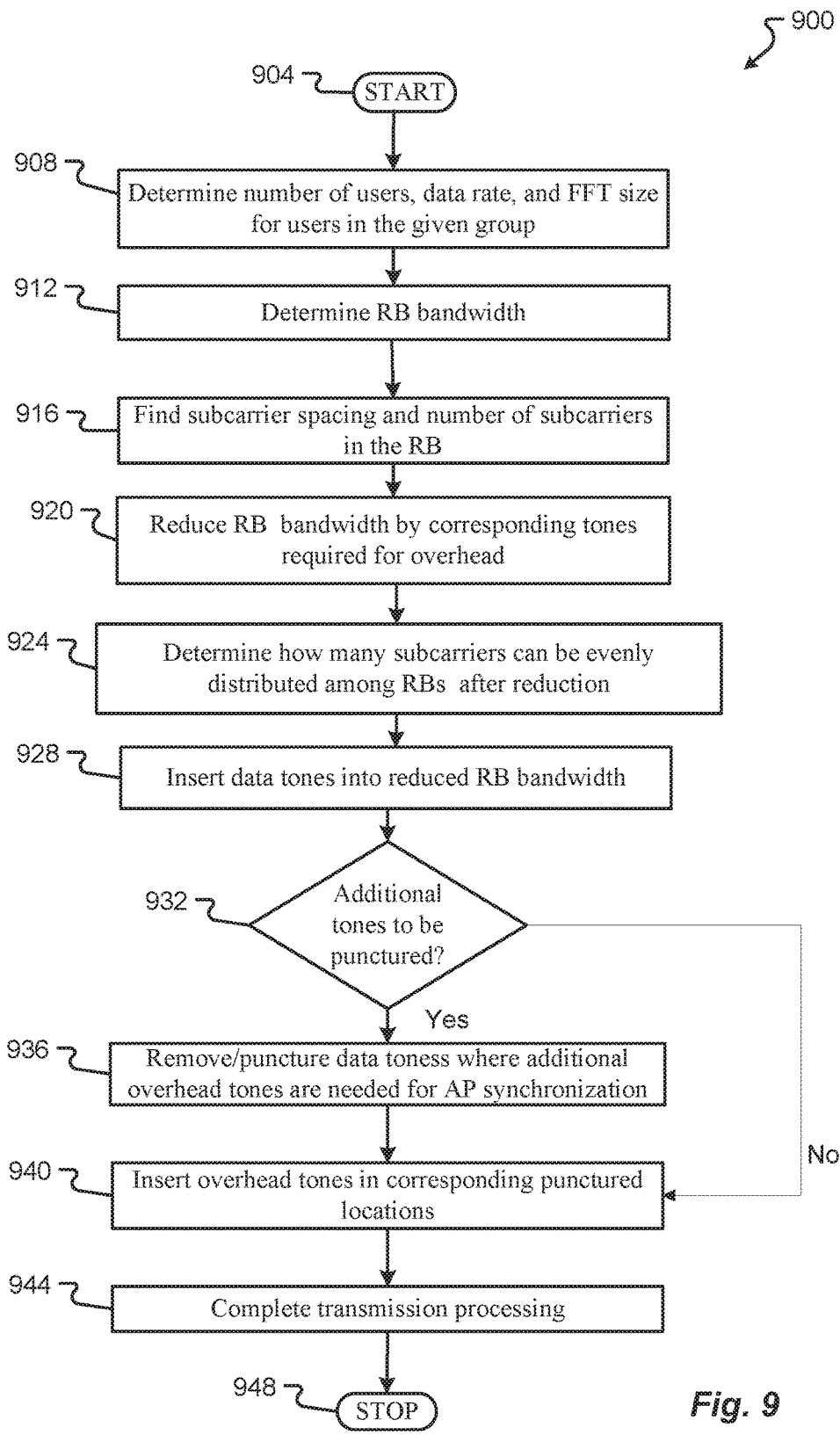
FIG. 9 is a flow or process diagram of a method for determining subcarrier allocation with some overhead tones removed.

An exemplary method 900 for determining tone distribution is shown in FIG. 9. Generally, the method 900 starts with a start operation 904 and ends with an end operation 948. The method 900 can include more or fewer steps or can arrange the order of the steps differently than those shown in FIG. 9. The method 900 can be executed as a set of computer-executable instructions executed on a computer system or processor and encoded or stored on a computer readable medium. Hereinafter, the method 900 shall be explained with reference to the systems, components, modules, software, user interfaces, etc. described in conjunction with FIGS. 1-8.

A wireless communication system allocates a total allocated bandwidth to the network based on demand. The total allocated bandwidth is categorized into groups and further divided according to those demands on the network, including but not limited to, the number of users on the node, data rate and FFT size for the users in the group as described in step 908 and in more detail and in conjunction with FIG. 6.

Next, as described herein, and in conjunction with FIGS. 5-6, the RB bandwidth is determined in step 912. As previously explained, RB bandwidth can be found through various methods. In one embodiment, the bandwidth can be determined through subcarrier spacing. In another embodiment, the bandwidth is determined based on the FFT size. In the present embodiment, the RB bandwidth can be statistically determined in the specification instead of dynamically selected. Therefore, an access point can choose the 20, 40, 80 or 160 MHz total allocated bandwidth based on the legacy station it is communication with. That is, the AP can use a 20 MHz signal format for a legacy 802.11a station and/or an 80 MHz signal format for 802.11ax or 802.11ac stations. Once the total allocated bandwidth is selected, the AP can partition the total allocated bandwidth into resource blocks and assign the resource blocks to users.

Once the RB bandwidth is known, subcarrier spacing and the resource block size can be computed as indicated in step 916. Subcarrier spacing is a function of the total allocated bandwidth and the size of the FFT. The resource block size or number of subcarriers in the RB bandwidth is found by dividing the RB bandwidth by the subcarrier spacing. An example of how to determine the subcarrier spacing and number of subcarriers in the RB bandwidth can be found as follows: first, assume a 40 MHZ total allocated bandwidth has been determined with 512 FFT and 4 subbands and a RB bandwidth of 5 MHz; next, divide the 40 MHz total allocated bandwidth by the size of the FFT to find subcarrier spacing; finally, to determine the number of subcarriers in the RB bandwidth, divide the RB bandwidth by the subcarrier spacing obtained. In this instance, subcarrier spacing would be 0.078125. For a RB bandwidth of 5 MHz, this would correspond to a 64 tone resource block. More detailed descriptions and examples are described above in FIG. 5.

With subcarrier spacing determined and knowledge of number of subcarriers to be used in the RB bandwidth, the communication station/AP can begin allocating its resources. In one embodiment, the communication system/AP subtracts bandwidth to account for overhead tones prior to counting the available resource blocks in a band. Since overhead tones, specifically the DC tones and the guard tones, generally lie on the band edges, large puncturing will occur at those edges. This greater amount of puncturing could cause the system to downgrade the modulation and coding scheme. Subtracting the bandwidth ahead of time will reduce the effect of MCS downgrading due to puncturing. Thus, step 920 entails reducing the RB bandwidth by the number of tones needed for the overhead tones. For example, assume that a tone is removed from each resource block to account for the overheads that in particular reside on the band edges of the total allocated bandwidth. Assuming the RB bandwidth of 5 MHz and subcarrier spacing of 0.078125 MHz with an 64 tone resource block, from above, then one tone removed from the 5 MHz RB bandwidth would leave a 4.921875 MHz band. Equivalently, 63 tones times the subcarrier spacing confirms the remaining 4.921875 MHz band. Thus, 63 data tones would then be evenly distributed in the approximate 4.9 MHz bandwidth. This distribution is described in step 924. More detailed examples of this process are described in FIGS. 7-8.

Next, in step 928, insert data tones into each of the reduced size resource blocks. Again, the process of coding, modulating, and processing the symbols using the modules and components are described in detail in FIG. 2. Since the initial bandwidth reduction accounted mostly for band edge and DC tone overhead, the system must still account for any overhead not initially punctured. If multiple users are part of the total allocated bandwidth, then, in step 932, the DC tones for those communication stations will need to punctured, as will any pilot tones. In downlink transmission, multiple users may share a set of common pilot tones sent for the total allocated bandwidth. However, in uplink transmission, each of the multiple users may have their own pilot tone in their RB bandwidth. Therefore, the number of pilots varies with the number OFDMA users. If no additional puncturing is required, then the system can continue on to step 940 and insert the overhead tones in the punctured locations. If however, these multiple users exist or even a single user with pilot tones is present, removal of those data tones is recommended.

Step 936 and step 940, involve the removal or puncturing of some of the data tones that where distributed about the resource block and replacement by the overhead tones (i.e., DC tones needed for AP synchronization and user pilot tones). In an actual transmission, tones that do not get transmitted are treated as punctured tones at the receiver. Namely, the receiver treats the un-transmitted tones as if they tones are sent over the channel with zero gains. This simplified hardware implementation without implementing many encoding/decoding patterns for various multi-user allocations and system configurations. Alternatively, the overhead tones can be replaced by "NULL" bits as place holders for the punctured tones prior to interleaving and puncturing after, but this turns out to be more costly in terms of interleaver complexity. This method is described in greater detail below. In some instances, the overhead tones (i.e. the punctured tones) are removed first and the data symbols are mapped to the remaining tones. No data symbols require removal and/or puncturing and the receiver decodes only the tones carrying the data. Step 944 completes the process and transmits or receives the frames.

In general, a way of accounting for DC tones and guard tones, is to fill the DC and guard tones with "NULL" bits in the interleaver. These "NULL" bits are then punctured after the interleaving process. However, the interleaving process can become increasingly complex with the increase in number of resource blocks processed. To reduce complexity, "NULL" bits may not be used. The present embodiment as described above addresses this. Because information bits are encoded, mapped to QAM symbols or any other modulation scheme, for each tone of the allocated RBs and some of the QAM symbols get punctured if they overlap with DC tones, guard tones, and pilot tones, there is no need to exclude the overhead tones in the interleaving process, thus reducing the complexity. The key lies in the use definition of NCBPS, the number of coded bits per symbol. Since NCBPS is a function of the number of coded bits per subcarrier (NBPSC) and the number of RBs n, allocated to a communication station 104, the DC and guard tones get accounted for without the need to exclude or use "NULL" bits.

Figure 10:
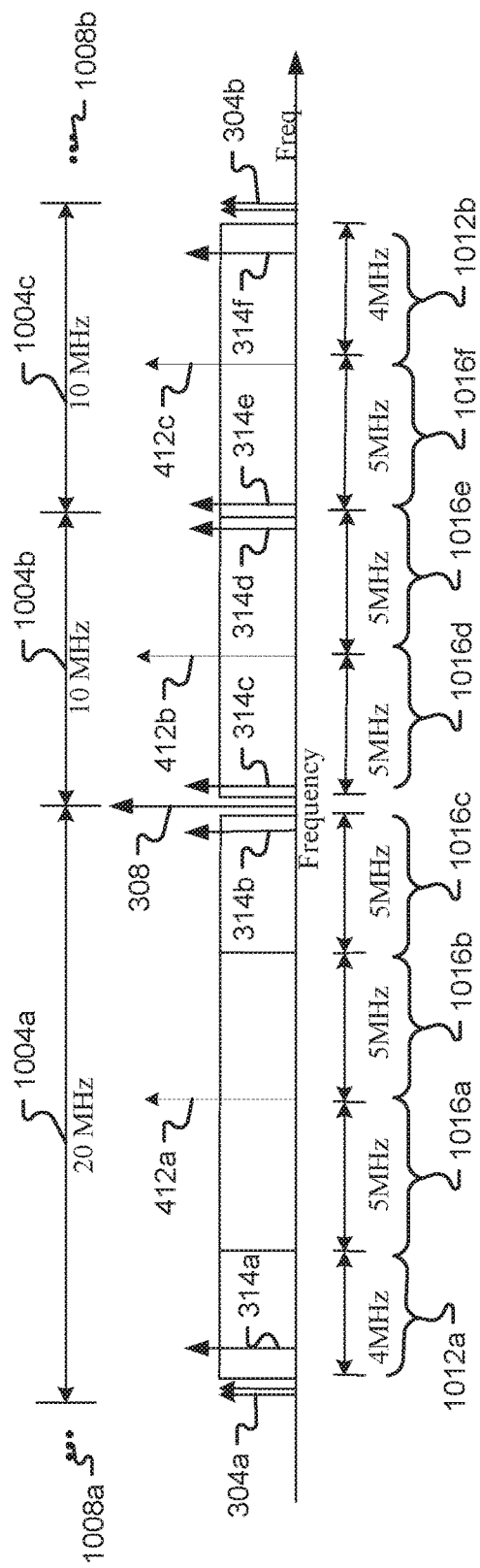
FIG. 10 depicts an embodiment of subcarrier allocation with varying resource block size.

FIG. 10 is an exemplary embodiment of subcarrier allocation with varying resource blocks 1012a-b and 1016a-f. As described above, most overhead tones reside on band edges. By puncturing overhead tones after data tones are appropriated in the resource block, band edge resource blocks can suffer from severe puncturing. Embodiments in FIGS. 7-9 above described a method for reducing the size of the resource block to overcome this issue. In the present embodiment, a similar method is proposed in that the RB size is to be reduced. However, in this embodiment, an improvement is proposed wherein two resource blocks are defined within the total allocated bandwidth with two different bandwidths. The resource blocks at the band edges 1012*a-b* would have one bandwidth and the resource blocks in the interior of the band 1016*a-f* would have a different bandwidth. That is, the overhead puncturing is accounted for at the band edges, hence bandwidth reduced for those resource blocks. The inner resource blocks who don't suffer from severe puncturing are thus left untouched and the entire bandwidth can be used for resource allocation. After the new size of the resource blocks are determined, then puncturing will still be applied to the data tones of the resource block who overlap user unreserved DC tones 412*a-c* and pilot tones 314*a-f*.

The exemplary embodiment of FIG. 10 depicts three users with allocated bandwidths 1004*a*, 1004*b*, 1004*c*, respectively, having 5 MHz RB bandwidths 1016*a-f* and 4 MHZ RB bandwidths 1012*a-b*. A first user is allocated bandwidth 1004*a* corresponding to 20 MHz, while the other two users have allocated bandwidths 1004*b* and 1004*c*, corresponding to 10 MHz. The total number of users can be more or less as represented by ellipses 1008*a-b*.

The varying resource blocks 1012*a-b* and 1016*a-f* are shown, where 4 MHz RB bandwidth 1012*a-b* corresponds to the reduced size resource block at the band edges and the RB bandwidth 1016*a-f* remains untouched, which corresponds to the original RB bandwidth. A description of how to find the RB bandwidth as well as subcarrier spacing which will be needed to reduce the resource block size has been described in detail above under FIGS. 5-9. Also depicted in FIG. 10 are DC tones 412*a-c*, 308, guard tones 304*a-b* and pilot tones 314*a-f*. Notice that DC tone(s) 308 and guard tones 304*a-b* are not part of the residuary resource blocks as they are accounted for by the reduced 4 MHz RB bandwidths 1012*a-b*. However, DC tone(s) 308 can be left unpunctured and accounted for later with DC tones 412 and pilot tones 314*a-f* which will be punctured after data tones are allocated to maximize the number of usable tones. In another embodiment, the number of users' allocated bandwidths 1004*a-c* can extend beyond three, and the RBs can be of varying different widths. The functionality of the receiver can remain unmodified with the process described herein. The overhead tone placement in corresponding resource blocks before or after data tone allocation may not play a role in modifying the receiver functionality. Similarly, reduction in RB bandwidths does not modify receiver functionality.

Figure 11:
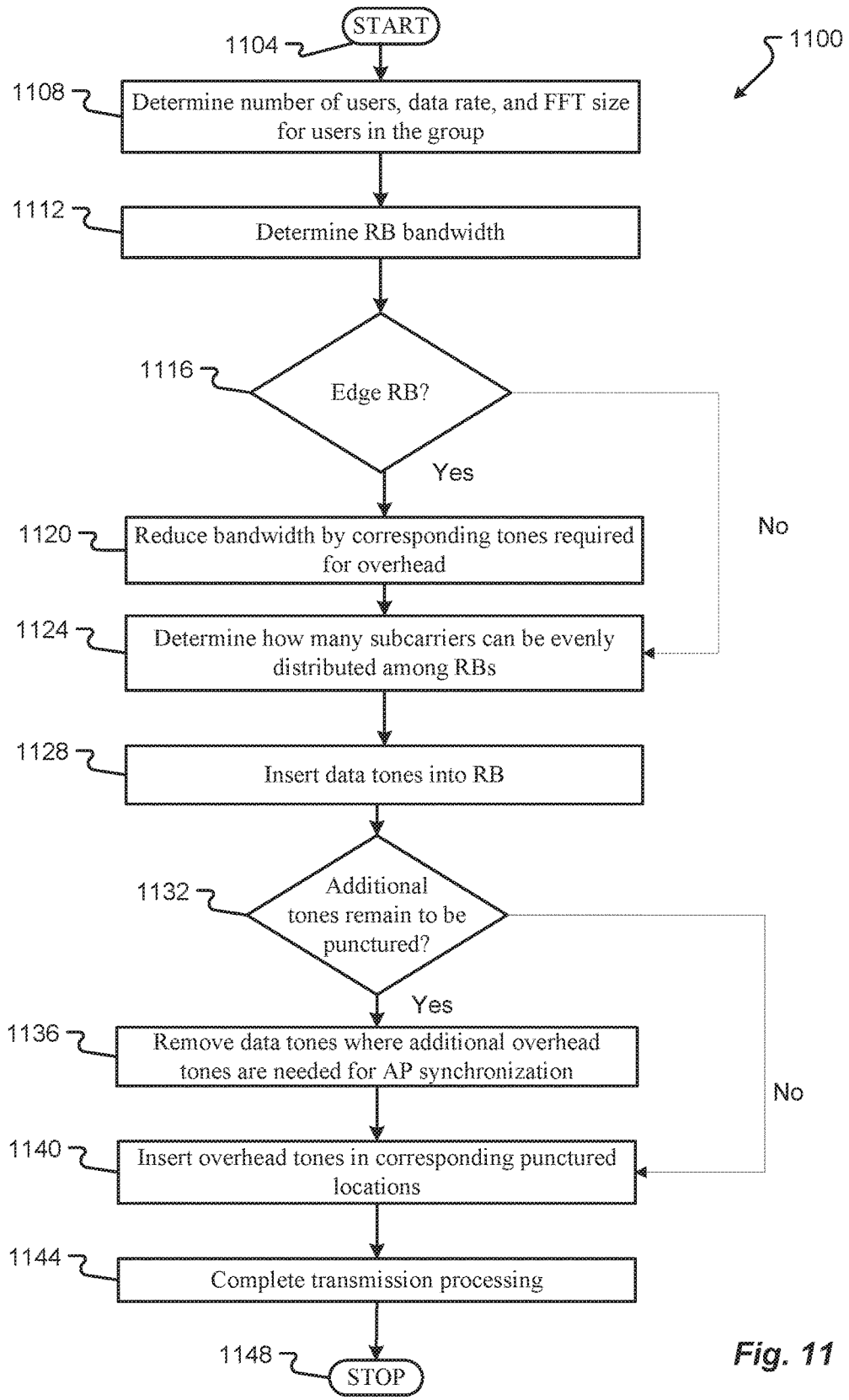
FIG. 11 is a flow or process diagram of a method for determining subcarrier allocation with varying RB size.

An exemplary method 1100 for determining tone distribution is shown in FIG. 11. Generally, the method 1100 starts with a start operation 1104 and ends with an end operation 1148. The method 1100 can include more or fewer steps or can arrange the order of the steps differently than those shown in FIG. 11. The method 1100 can be executed as a set of computer-executable instructions executed on a computer system or processor and encoded or stored on a computer readable medium. Hereinafter, the method 1100 shall be explained with reference to the systems, components, modules, software, user interfaces, etc. described in conjunction with FIGS. 1-10.

A wireless communication system allocates a total allocated bandwidth to the network based on demand. The total allocated bandwidth is categorized into groups and further divided according to those demands on the network, including but not limited to, the number of users on the node, data rate and FFT size for the users in the group as described in step 1108 and in more detail and in conjunction with FIG. 6.

Next, as described herein, and in conjunction with FIGS. 5-6, the RB bandwidth is determined in step 1112. As previously explained, RB bandwidth can be found through various methods. In the present embodiment, this can be defined in the specification.

With subcarrier spacing determined and knowledge of the number of subcarriers to be used in the RB bandwidth, the system can begin allocating its resources. In one embodiment, the system subtracts out bandwidth to account for overhead tones prior to counting the available RBs in a band. Since overhead tones, specifically the guard tones, generally lie on the band edges, large puncturing will occur at those edges. This greater amount of puncturing could cause the system to downgrade the modulation and coding scheme (MCS). Subtracting the bandwidth ahead of time will reduce the effect of MCS downgrading due to puncturing. In the current embodiment, two resource blocks can be defined with different bandwidths to account for the band edge puncturing. If, the resource block does not lie on an edge, step 1116, then the bandwidth of the bandwidth resource block is left untouched and the process continues to step 1124. At step 1124, determination is made as to the number of data tones that will be distributed among the resource blocks. Again, determining the number of data tones that fit within a resource block is described in detail in FIGS. 5, 6, and 9.

If however, the resource block is on a band edge, step 1116, then that bandwidth is reduced in width to account for the extra puncturing and the process continues to step 1120. Thus, step 1120 entails reducing the RB bandwidth by the number of tones needed for the overhead tones. However, distinct from the process set forth in FIG. 9, the tones are removed from the resource blocks that lie on the edge of the total allocated bandwidth while the inner RBs are left untouched. The process applied in reducing the size of the resource block bandwidth is very similar or the same as that described in detail and in conjunction with FIGS. 7-10.

Next, in step 1128, insert data tones into each of the resource blocks. Again, the process of coding, modulating, and processing the symbols using the modules and components are described in detail in FIG. 2. Since the initial bandwidth reduction accounted mostly for edge portions of the total allocated bandwidth and DC tone overhead, the system must still account for any overhead not initially punctured, in step 1132. If multiple users are part of the total allocated bandwidth, then, in step 1136, the DC tones for those communication stations/AP will need to punctured, as will any pilot tones. If no additional puncturing is required, then the system can continue on to step 1140 and insert the overhead tones in the punctured locations. If however, these multiple users exist or even a single user with pilot tones, is present, removal of those data tones is required.

Step 1136 and step 1140, involve the removal or puncturing of some of the data tones that were distributed about the resource block and replacement by the overhead tones (i.e., DC tones needed for AP synchronization and user pilot tones). Alternatively, the overhead tones can be replaced by "NULL" bits prior to interleaving and then puncturing next but this turns out to be more costly in terms of interleaver complexity. Step 1144 completes the process and transmits or receives the frames.

Aspects are thus directed toward:

A system, comprising:
a memory;
a processor;
a transmitter, the transmitter configured to:
transmit a frame associated with at least one of a plurality of resource blocks, wherein the frame is allocated a total allocated bandwidth;
the processor configured to:
identify a bandwidth for at least one of the plurality of resource blocks;
determine a total number of subcarriers based at least in part on a subcarrier spacing corresponding to the identified bandwidth and the total allocated bandwidth;
allocate a plurality of data tones equivalent to the determined total number of subcarriers associated with the at least one of a plurality of resource blocks;
identify, in the at least one of the plurality of resource blocks, one or more locations as puncture locations for overhead tone placement;
remove at least one of the plurality of data tones in each of the one or more puncture locations corresponding to an overhead tone location; and
place one or more overhead tones in each of the one or more puncture locations in the at least one of the plurality of resource blocks.

The system of any of the above aspects, wherein the identified bandwidth is reduced by at least one of a plurality of usable tones for overhead tone placement, and wherein the identified bandwidth reduction is completed prior to allocation of the plurality of data tones.

The system of any of the above aspects, wherein the identified bandwidth of the plurality of resource blocks is reduced, and wherein the data tones are evenly distributed across the plurality of resource blocks with reduced bandwidth.

The system of any of the above aspects, wherein in the total allocated bandwidth, the identified bandwidth of one or more of the plurality of resource blocks remains unmodified, and the identified bandwidth of one or more of the plurality of other resource blocks is reduced.

The system of any of the above aspects, wherein the identified bandwidth of the plurality of resource blocks on a band edges are reduced.

The system of any of the above aspects, wherein the identified bandwidth of the plurality of resource blocks in an interior portion of the total allocated bandwidth band remain unmodified.

A method comprising:
identifying, by a processor, a bandwidth for a resource block;
determining, by the processor, a total number of subcarriers based at least in part on a subcarrier spacing corresponding to the identified bandwidth;
allocating, by the processor, a plurality of data tones equivalent to the determined total number of subcarriers;
identifying, by the processor, in the resource block one or more locations as puncture locations for overhead tone placement;
removing, by the processor, at least one of the plurality of data tones in the resource block at each of the one or more puncture locations corresponding to an overhead tone location;
placing, by the processor, one or more overhead tones in each of the one or more puncture locations in the resource block; and
transmitting, by a transceiver, a frame with the resource block.

The method of any of the above aspects, wherein determining the subcarrier spacing includes a division of a total allocated bandwidth with a multiplexed FFT carrier size.

The method of any of the above aspects, wherein in allocating the plurality of data tones includes operations to encode and map information bits to the resource block.

The method of any of the above aspects, wherein the identified bandwidth is reduced by at least one of a plurality of usable tones for overhead tone placement, and wherein the identified bandwidth reduction is completed prior to allocation of the plurality of data tones.

The method of any of the above aspects, wherein the total allocated bandwidth comprises one or more resource blocks, wherein each of the resource blocks has an identified bandwidth within the total allocated bandwidth, wherein the identified bandwidth of all resource blocks in the total allocated bandwidth is reduced, and wherein the plurality of data tones are evenly distributed across all of the reduced resource blocks.

The method of any of the above aspects, wherein the total allocated bandwidth comprises one or more resource blocks, wherein each of the resource blocks has an identified bandwidth within the total allocated bandwidth, wherein the identified bandwidth of at least one of the one or more of the resource blocks remain unmodified, and the identified bandwidth of at least one of the one or more other resource blocks is reduced.

The method of any of the above aspects, wherein the identified bandwidth of the resource blocks on a band edges are reduced.

The method of any of the above aspects, wherein the identified bandwidth of the resource blocks in an interior portion of the total allocated bandwidth remain unmodified.

The method of any of the above aspects, further comprising operations to treat un-transmitted tones as punctured tones in a receiver.

The method of any of the above aspects, wherein the un-transmitted tones are tones transmitted over a channel with zero gains.

A non-transitory computer readable medium having instructions thereon that when executed by at least one processor of a communication station perform a method comprising:
identifying, by a processor, a bandwidth for a resource block;
determining, by the processor, a total number of subcarriers based at least in part on a subcarrier spacing corresponding to the identified bandwidth and a total allocated bandwidth;
allocating, by the processor, a plurality of data tones equivalent to the determined total number of subcarriers;
identifying, by the processor, in the resource block one or more locations as puncture locations for overhead tone placement;
removing, by the processor, at least one of the plurality of data tones in the resource block at each of the one or more puncture locations corresponding to an overhead tone location;
placing, by the processor, one or more overhead tones in each of the one or more puncture locations in the resource block; and
transmitting, by a transceiver, a frame with the resource block.

The media of any of the above aspects, wherein the total allocated bandwidth comprises one or more resource blocks, wherein each of the resource blocks has an identified bandwidth within the total allocated bandwidth, wherein the identified bandwidth of all resource blocks in the total allocated bandwidth is reduced, and wherein the plurality of data tones are evenly distributed across all of the reduced resource blocks.

The media of any of the above aspects, wherein the total allocated bandwidth comprises one or more resource blocks, wherein each of the resource blocks has an identified bandwidth within the total allocated bandwidth, wherein the identified bandwidth of at least one of the one or more of the resource blocks remain unmodified, and the identified bandwidth of at least one of the one or more other resource blocks is reduced.

The media of any of the above aspects, wherein the identified bandwidth of the resource blocks on a band edges are reduced, and wherein the identified bandwidths of the resource blocks in an interior portion of the total allocated bandwidth remain unmodified.

A system comprising:
a means for identifying a bandwidth for a resource block;
a means for determining a total number of subcarriers based at least in part on a subcarrier spacing corresponding to the identified bandwidth;
a means for allocating a plurality of data tones equivalent to the determined total number of subcarriers;
a means for identifying, in the resource block one or more locations as puncture locations for overhead tone placement;
a means for removing at least one of the plurality of data tones in the resource block at each of the one or more puncture locations corresponding to an overhead tone location;
a means for placing one or more overhead tones in each of the one or more puncture locations in the resource block; and
a means for transmitting a frame with the resource block.

The system of any of the above aspects, wherein determining the subcarrier spacing includes a division of a total allocated bandwidth with a multiplexed FFT carrier size.

The system of any of the above aspects, wherein in allocating the plurality of data tones includes operations to encode and map information bits to the resource block.

The system of any of the above aspects, wherein the identified bandwidth is reduced by at least one of a plurality of usable tones for overhead tone placement, and wherein the identified bandwidth reduction is completed prior to allocation of the plurality of data tones.

The system of any of the above aspects, wherein the total allocated bandwidth comprises one or more resource blocks, wherein each of the resource blocks has an identified bandwidth within the total allocated bandwidth, wherein the identified bandwidth of all resource blocks in the total allocated bandwidth is reduced, and wherein the plurality of data tones are evenly distributed across all of the reduced resource blocks.

The system of any of the above aspects, wherein the total allocated bandwidth comprises one or more resource blocks, wherein each of the resource blocks has an identified bandwidth within the total allocated bandwidth, wherein the identified bandwidth of at least one of the one or more of the resource blocks remain unmodified, and the identified bandwidth of at least one of the one or more other resource blocks is reduced.

The system of any of the above aspects, wherein the identified bandwidth of the resource blocks on a band edges are reduced.

The system of any of the above aspects, wherein the identified bandwidth of the resource blocks in an interior portion of the total allocated bandwidth remain unmodified.

The system of any of the above aspects, further comprising operations to treat un-transmitted tones as punctured tones in a receiver.

The system of any of the above aspects, wherein the un-transmitted tones are tones transmitted over a channel with zero gains.

Current embodiments provide solutions that remove the complexity of resource allocation and address the issues arising from wasted usable tones. In one embodiment, the technique for defining a resource block without consideration of overhead tones in the initial resource allocation is provided. In another embodiment, puncturing data tones at overhead locations is provided. Still in another embodiment, resizing RB bandwidth to account for overhead tones pre-resource block allocation is provided. Still yet in another embodiment, defining two or more resource blocks within different RB bandwidth to account for puncturing is provided.

The exemplary embodiments are described in relation to resource block allocation in a multi-user High-Efficiency WLAN MIMO system. However, it should be appreciated, that in general, the systems and methods herein will work equally well for any type of communication system in any environment utilizing any one or more protocols including wired communications, wireless communications, power-line communications, coaxial cable communications, fiber optic communications and the like.

The exemplary systems and methods are described in relation to IEEE 802.11 transceivers and associated communication hardware, software and communication channels. However, to avoid unnecessarily obscuring the present disclosure, the following description omits well-known structures and devices that may be shown in block diagram form or otherwise summarized.

For purposes of explanation, numerous details are set forth in order to provide a thorough understanding of the present embodiments. It should be appreciated however that the techniques herein may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a communications network and/or the Internet, or within a dedicated secure, unsecured and/or encrypted system. Thus, it should be appreciated that the components of the system can be combined into one or more devices, such as an access point or station, or collocated on a particular node/element(s) of a distributed network, such as a telecommunications network. As will be appreciated from the following description, and for reasons of computational efficiency, the components of the system can be arranged at any location within a distributed network without affecting the operation of the system. For example, the various components can be located in a transceiver, an access point, a station, a management device, or some combination thereof. Similarly, one or more functional portions of the system could be distributed between a transceiver, such as an access point(s) or station(s) and an associated computing device.

Furthermore, it should be appreciated that the various links, including communications channel(s), connecting the elements (which may not be not shown) can be wired or wireless links, or any combination thereof, or any other known or later developed element(s) that is capable of supplying and/or communicating data and/or signals to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

While the above-described flowcharts have been discussed in relation to a particular sequence of events, it should be appreciated that changes to this sequence can occur without materially effecting the operation of the embodiment(s). Additionally, the exact sequence of events need not occur as set forth in the exemplary embodiments, but rather the steps can be performed by one or the other transceiver in the communication system provided both transceivers are aware of the technique being used for initialization. Additionally, the exemplary techniques illustrated herein are not limited to the specifically illustrated embodiments but can also be utilized with the other exemplary embodiments and each described feature is individually and separately claimable.

The above-described system can be implemented on a wireless telecommunications device(s)/system, such an 802.11 transceiver, or the like. Examples of wireless protocols that can be used with this technology include 802.11a, 802.11b, 802.11g, 802.11n, 802.11ac, 802.11ad, 802.11af, 802.11ah, 802.11ai, 802.11aj, 802.11aq, 802.11ax, WiFi, LTE, 4G, Bluetooth®, WirelessHD, WiGig, WiGi, 3GPP, Wireless LAN, WiMAX, or the like.

The term transceiver as used herein can refer to any device that comprises hardware, software, firmware, or combination thereof and is capable of performing any of the methods described herein.

Additionally, the systems, methods and protocols can be implemented on one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can be used to implement the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software and/or firmware that can be stored on a storage medium, executed on programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there has been provided systems and methods for resource block allocation. While the embodiments have been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this disclosure.

The invention claimed is:

1. A system, comprising:
a transmitter connectable to a communication channel, the transmitter configured to:
  transmit, over the communication channel, a frame associated with at least one of a plurality of resource blocks, wherein the frame is allocated a total allocated bandwidth;
a processor, connected to a puncture module, configured to:
  identify a bandwidth for at least one of the plurality of resource blocks;
  determine a total number of subcarriers based at least in part on a subcarrier spacing corresponding to the identified bandwidth and the total allocated bandwidth;
  allocate a plurality of data tones equivalent to the determined total number of subcarriers associated with the at least one of a plurality of resource blocks;
  identify, in the at least one of the plurality of resource blocks, one or more locations as puncture locations for overhead tone placement;

remove at least one of the plurality of data tones in each of the one or more puncture locations corresponding to an overhead tone location; and place one or more overhead tones in each of the one or more puncture locations in the at least one of the plurality of resource blocks.

2. The system of claim 1, wherein the identified bandwidth is reduced by at least one of a plurality of usable tones for overhead tone placement, and wherein the identified bandwidth reduction is completed prior to allocation of the plurality of data tones.

3. The system of claim 2, wherein the identified bandwidth of the plurality of resource blocks is reduced, and wherein the data tones are evenly distributed across the plurality of resource blocks with reduced bandwidth.

4. The system of claim 1, wherein in the total allocated bandwidth, the identified bandwidth of one or more of the plurality of resource blocks remains unmodified, and the identified bandwidth of one or more of the plurality of other resource blocks is reduced.

5. The system of claim 4, wherein the identified bandwidth of the plurality of resource blocks on a band edges are reduced.

6. The system of claim 4, wherein the identified bandwidth of the plurality of resource blocks in an interior portion of the total allocated bandwidth band remain unmodified.

7. A system comprising:
means for identifying a bandwidth for a resource block;
means for determining a total number of subcarriers based at least in part on a subcarrier spacing corresponding to the identified bandwidth;
means for allocating a plurality of data tones equivalent to the determined total number of subcarriers;
means for identifying in the resource block one or more locations as puncture locations for overhead tone placement;
means for removing at least one of the plurality of data tones in the resource block at each of the one or more puncture locations corresponding to an overhead tone location;
means for placing one or more overhead tones in each of the one or more puncture locations in the resource block; and
means for transmitting a frame with the resource block.

8. The system of claim 7, wherein determining the subcarrier spacing includes a division of a total allocated bandwidth with a multiplexed FFT carrier size.

9. The system of claim 7, wherein in allocating the plurality of data tones includes operations to encode and map information bits to the resource block.

10. The system of claim 8, wherein the identified bandwidth is reduced by at least one of a plurality of usable tones for overhead tone placement, and wherein the identified bandwidth reduction is completed prior to allocation of the plurality of data tones.

11. The system of claim 10, wherein the total allocated bandwidth comprises one or more resource blocks, wherein each of the resource blocks has an identified bandwidth within the total allocated bandwidth, wherein the identified bandwidth of all resource blocks in the total allocated bandwidth is reduced, and wherein the plurality of data tones are evenly distributed across all of the reduced resource blocks.

12. The system of claim 10, wherein the total allocated bandwidth comprises one or more resource blocks, wherein each of the resource blocks has an identified bandwidth within the total allocated bandwidth, wherein the identified bandwidth of at least one of the one or more of the resource blocks remain unmodified, and the identified bandwidth of at least one of the one or more other resource blocks is reduced.

13. The system of claim 12, wherein the identified bandwidth of the resource blocks on a band edges are reduced.

14. The system of claim 13, wherein the identified bandwidth of the resource blocks in an interior portion of the total allocated bandwidth remain unmodified.

15. The system in claim 13, further comprising operations to treat un-transmitted tones as punctured tones in a receiver.

16. The system of claim 15, wherein the un-transmitted tones are tones transmitted over a channel with zero gains.

17. A non-transitory computer readable medium having instructions stored thereon that when executed by at least one processor of a communication station perform a communication method comprising:
identifying a bandwidth for a resource block;
determining a total number of subcarriers based at least in part on a subcarrier spacing corresponding to the identified bandwidth and a total allocated bandwidth;
allocating a plurality of data tones equivalent to the determined total number of subcarriers;
identifying in the resource block one or more locations as puncture locations for overhead tone placement;
removing at least one of the plurality of data tones in the resource block at each of the one or more puncture locations corresponding to an overhead tone location;
placing one or more overhead tones in each of the one or more puncture locations in the resource block; and
transmitting, by a transceiver, a frame with the resource block.

18. The non-transitory medium of claim 17, wherein the total allocated bandwidth comprises one or more resource blocks, wherein each of the resource blocks has an identified bandwidth within the total allocated bandwidth, wherein the identified bandwidth of all resource blocks in the total allocated bandwidth is reduced, and wherein the plurality of data tones are evenly distributed across all of the reduced resource blocks.

19. The non-transitory medium of claim 17, wherein the total allocated bandwidth comprises one or more resource blocks, wherein each of the resource blocks has an identified bandwidth within the total allocated bandwidth, wherein the identified bandwidth of at least one of the one or more of the resource blocks remain unmodified, and the identified bandwidth of at least one of the one or more other resource blocks is reduced.

20. The non-transitory medium of claim 19, wherein the identified bandwidth of the resource blocks on a band edges are reduced, and wherein the identified bandwidths of the resource blocks in an interior portion of the total allocated bandwidth remain unmodified.

* * * * *